United States Patent [19]
Tokiwa et al.

[11] 3,979,318
[45] Sept. 7, 1976

[54] STABILIZED SODIUM PERCARBONATE COMPOSITION

[75] Inventors: Fumikatsu Tokiwa, Sakura; Takehiko Kobayashi, Zushi, both of Japan

[73] Assignee: Kao Soap Co., Ltd., Tokyo, Japan

[22] Filed: Dec. 13, 1974

[21] Appl. No.: 532,414

[30] Foreign Application Priority Data
Dec. 20, 1973 Japan.............................. 48-143092

[52] U.S. Cl.................................. 252/186; 252/95; 252/99; 252/383; 252/384; 8/111; 427/212; 427/213; 210/610 A
[51] Int. Cl.²......................................... C01B 15/10

[58] Field of Search ............. 252/95, 383, 384, 186; 423/272; 8/111; 260/610 A; 427/212, 213

[56] References Cited
UNITED STATES PATENTS

| | | | |
|---|---|---|---|
| 3,607,759 | 9/1971 | Barth................................ | 252/95 X |
| 3,847,830 | 11/1974 | Williams.............................. | 252/95 |

Primary Examiner—Mayer Weinblatt
Attorney, Agent, or Firm—Woodhams, Blanchard and Flynn

[57] ABSTRACT

Sodium percarbonate is stabilized by mixing therein sodium perborate and a hydrophobic liquid organic compound.

11 Claims, No Drawings

STABILIZED SODIUM PERCARBONATE COMPOSITION

BACKGROUND OF THE INVENTION

1. Field of the Invention

This invention relates to sodium percarbonate compositions having a long shelf life or an excellent stability property.

2. Description of the Prior Art

Sodium percarbonate is a known substance useful as a bleaching agent or oxidizing agent. Sodium percarbonate and sodium perborate are typical oxygen-type bleaching agents for domestic and commercial clothes washing purposes. Sodium percarbonate has the formula: $2Na_2CO_3 \cdot 3H_2O_2$. It is generally prepared by reacting sodium carbonate with hydrogen peroxide.

Although the bleaching power of sodium percarbonate is a little lower than that of chlorine-type bleaching agents at ambient temperature (20°–25°C), sodium percarbonate has the advantage that it can be applied to synthetic fibers, animal fibers, resin-treated fibers and fluorescent brightening agent-treated fibers without causing yellow staining or otherwise damaging the fibers. A sufficient bleaching effect thereof can be obtained by raising the treatment temperature or by using a decomposition promoting agent in combination therewith. Thus, sodium percarbonate is used particularly as a bleaching agent for domestic and commercial clothes washing purposes.

The reasons why sodium percarbonate is attracting attention as an ingredient in general purpose clothes washing detergents and domestic bleaching agents are that its decomposition products cause no environmental pollution and it can be put to practical use in a variety of different ways without difficulty.

However, in comparison with sodium perborate, sodium percarbonate has, disadvantageously, a lower stability during storage and it loses available oxygen rapidly during storage. Due to the high compatibility of sodium percarbonate with water, the surface thereof becomes wetted or absorbs water even in an atmosphere of very low humidity whereby it is decomposed. In the presence of metal ion such as iron, copper, manganese or cobalt, the decomposition of sodium percarbonate is further promoted. Thus, sodium percarbonate is inferior to sodium perborate with respect to stability.

When sodium percarbonate is stored by itself in a closed vessel, it exhibits a shelf life equivalent to that of sodium perborate. However, when sodium percarbonate is stored in the form of a mixture with a detergent, or in an open vessel, the storage stability thereof is reduced due to its high hygroscopicity, even through it has a high solubility.

Another disadvantage of sodium percarbonate is that it forms lumps or cakes if it is allowed to stand in the form of a powder. This lumping poses a practical problem when it is intended to use percarbonate in the form of a powder.

In view of the circumstances described above, it is desired to provide sodium percarbonate which can be stored in an open vessel without fear of decomposition or lumping and which is free from any practical problem of insufficient shelf life, even when it is mixed with other ingredients of detergent or bleaching compositions.

Previously proposed processes for stabilizing sodium percarbonate include coating sodium percarbonate with a paraffin or polyethylene glycol having a molecular weight of 3,000 to 8,000. The former process wherein the paraffin is used is impractical, because the water-solubility of the sodium percarbonate is reduced remarkably. The latter process wherein polyethylene glycol is used does not provide long time stabilization of sodium percarbonate, because polyethylene glycol per se has a considerable hygroscopicity, even though the water-solubility of sodium percarbonate is maintained.

Another process which has been proposed comprises adding at least two stabilizers selected from the group consisting of phosphoric acids, silicic acids, ethylenediamine tetraacetate and nitrilo triacetate to the aqueous hydrogen peroxide solution used in the preparation of the sodium percarbonate. However, those stabilizers have no practical stabilizing effect on sodium percarbonate in the presence of water or a detergent, although they apparently improve the heat stability.

Still another process comprises coating sodium percarbonate with sodium pyrophosphate. This process is also insufficient with respect to its stabilizing effect on sodium percarbonate in the presence of water or a detergent, although the decomposition caused by heat is reduced.

SUMMARY OF THE INVENTION

The object of this invention is to provide a sodium percarbonate composition which is stable both when it is stored by itself and when it is stored in the form of a mixture with detergents or decomposition promoting agents.

The object of this invention is attained by adding sodium perborate and a hydrophobic liquid organic compound to sodium percarbonate.

The hydrophobic liquid organic compound used in this invention should be capable of adhering to the fine powder of sodium perborate, and also forming a moisture-resistant coating film on the sodium percarbonate so as to provide a moisture-proofing effect thereon. The compound itself should be hydrophobic and have a melting point below about 15°C. It should also have a boiling point of above about 100°C so as to be non-volatile during normal conditions of storage. It should also be non-reactive to sodium percarbonate and sodium perborate. Further, the sodium perborate and sodium percarbonate should be essentially insoluble in the hydrophobic liquid organic compound. It is preferred that the hydrophobic liquid organic compound is used in an amount of about 5 to 10 wt. percent, based on the weight of sodium percarbonate.

Examples of the hydrophobic liquid organic compounds are as follows:

Chlorinated paraffins, trichlorobenzene

Saturated fatty alcohols having 5 to 10 carbon atoms and unsaturated fatty alcohols having 5 to 18 carbon atoms:
 Isoamyl alcohol, n-octylalcohol, oleyl alcohol, and hexanol Esters:
 Dioctyl phthalate, dibenzyl sebacate and methyl oleate Oils and fats:
 Castor oil, linseed oil, rape oil, peanut oil, soybean oil and rice bran oil Fatty acids:

Oleic acid, linoleic acid, undecanoic acid and caprylic acid

Polyoxypropylene derivatives:
 Polyoxypropylene (4–8) sorbitol, polyoxypropylene (1–4),
 ethylenediamine, polyoxypropylene (1–10) $C_8$–$C_{22}$ alkyl ethers and polyoxypropylene (1–10) $C_8$–$C_{22}$ fatty acid esters Polyoxyethylene derivatives:
 Polyoxyethylene (1–3) $C_8$–$C_{22}$ alkyl ethers and polyoxyethylene (1–3) $C_6$–$C_{22}$ alkylphenyl ethers.

The sodium perborate is preferably in the form of a fine powder so that the surface area thereof is as large as possible. The preferred maximum size of sodium perborate is such that it passes through a 100 mesh sieve (Tyler Standard). The amount of sodium perborate is preferably about 5 to 20 wt. percent, based on the weight of sodium percarbonate.

The sodium percarbonate generally has a particle size range of more than 100 mesh size (Tyler Standard), preferably from 40 to 12 mesh size.

In carrying out the present invention, the ingredients can be combined in various ways, as follows: (1) the hydrophobic liquid organic compound is added to sodium percarbonate particles to coat the latter with the former and then the fine powder of sodium perborate added therein so as to be adhered to the sodium percarbonate by the liquid, or (2) the hydrophobic liquid organic compound is mixed with the fine powder of sodium perborate and then the sodium percarbonate is coated with the mixture or (3) the hydrophobic liquid organic compound is added to a mixture of sodium percarbonate and sodium perborate to effect the coating.

The hydrophobic liquid organic compound optionally can be diluted with a lower alcohol such as methyl alcohol, ethyl alcohol or propyl alcohol, to improve the ease of mixing. The lower alcohol can be evaporated off after mixing is complete.

The invention will be further described below by reference to the following illustrative Examples.

EXAMPLE 1 AND COMPARATIVE EXAMPLE 1

100 Grams of dioctyl phthalate were sprayed and coated on 1,000 g of sodium percarbonate (32 mesh size) while the latter was moved in a fluidized bed at 25°C. After wetting the sodium percarbonate with dioctyl phthalate uniformly, 50 g of fine powder of sodium perborate which passed through a 100 mesh sieve were added thereto while maintaining the fluidized bed conditions whereby the fine powder of sodium perborate became adhered to the surface of sodium percarbonate. For comparison, the same process was repeated using dioctyl phthalate alone.

EXAMPLE 2 AND COMPARATIVE EXAMPLE 2

2,000 Grams of sodium percarbonate of 24 mesh particle size were mixed with fine powder of sodium perborate (150 g.) which passed a 100 mesh sieve, the resulting mixture was formed into a fluidized bed at 25°C. Thereafter, 150 g of chlorinated paraffin were sprayed onto the bed so that the sodium percarbonate became coated with the chlorinated paraffin containing the fine powder of sodium perborate. For comparison, the same process was repeated by using chlorinated paraffin alone.

EXAMPLE 3 AND COMPARATIVE EXAMPLE 3

200 Grams of oleyl alcohol were mixed with 100 g of fine powder of sodium perborate which passed a 200 mesh sieve. The mixture was diluted with 500 cc. of methyl alcohol and then sprayed and coated on 2,000 g of sodium percarbonate (24 mesh size) maintained in a continuous state of agitation in a mixer. Thereafter, the methyl alcohol was removed at 25°C, while the agitation was continued. For comparison, the same process was repeated by using oleyl alcohol alone.

EXAMPLE 4 AND COMPARATIVE EXAMPLE 4

200 Grams of linseed oil were mixed with 100 g of ethyl alcohol. The mixture was further mixed thoroughly with 100 g of sodium perborate of less than 100 mesh size. The mixture was then stirred together with 2,000 g of sodium percarbonate (16 mesh size) in a mixing vessel having a rotary stirrer to obtain composition comprising sodium percarbonate uniformly coated with the mixture. For comparison, the same process was repeated by using linseed oil alone.

EXAMPLE 5 AND COMPARATIVE EXAMPLE 5

1,000 Grams of sodium percarbonate (20 mesh size) were charged in a small ribbon blender, to which were then added 50 g of linoleic acid and the entire contents were stirred thoroughly. Then, 70 g of sodium perborate of less than 100 mesh size were added thereto and the stirring was continued. Finally, an additional 50 g of linoleic acid were added thereto and the entirety was stirred. For comparison, the same process was repeated by using linoleic acid alone.

EXAMPLE 6 AND COMPARATIVE EXAMPLE 6

200 Grams of polyoxyethylene (2) nonylphenyl ether were heated to 40°C and then sprayed uniformly on 2,000 g of sodium percarbonate (16 mesh size) in a fluidized bed. Then, 150 g of sodium perborate of less than 200 mesh size were added thereto and the moving was continued to effect uniform coating. The contents were cooled to about 25°C while the moving was continued. For comparison, the same process was repeated by using polyoxyethylene (2) nonylphenyl ether alone.

Stabilized sodium percarbonate obtained in Examples 1 through 6, sodium percarbonate stabilized by each of the hydrophobic liquid organic compounds alone in the comparative examples 1–6, sodium percarbonate stabilized with magnesium chloridesodium silicate No. 3 (3:1) and untreated sodium percarbonate, respectively, were mixed with a commercial detergent containing sodium straight chain alkylbenzene sulfonate in a proportion of 1:9 and allowed to stand in a room at 40°C, 80 percent RH. The amounts of remaining available oxygen after 15 days were as shown below.

Table 1

| No. | Stabilizer | Amount of Stabilizer (%) | Amount of remaining available oxygen after 15 days (% of original) |
|---|---|---|---|
| Example | | | |
| 1 | Dioctyl phthalate + sodium perborate | 15.0 | 73.2 |
| 2 | Chlorinated paraffin + sodium perborate | 15.0 | 69.7 |
| 3 | Oleyl alcohol + sodium perborate | 15.0 | 70.6 |
| 4 | Linseed oil + sodium perborate | 15.0 | 72.1 |
| 5 | Linoleic acid + sodium perborate | 17.0 | 71.5 |
| 6 | Polyoxyethylene (2) nonylphenyl ether + sodium perborate | 17.5 | 66.3 |
| Comparative Example | | | |
| 1 | Dioctyl phthalate | 15.0 | 27.9 |
| 2 | Chlorinated paraffin | 15.0 | 26.6 |
| 3 | Oleyl alcohol | 15.0 | 30.3 |
| 4 | Linseed oil | 15.0 | 29.2 |
| 5 | Linoleic acid | 17.0 | 29.2 |
| 6 | Polyoxyethylene (2) nonylphenyl ether | 17.5 | 21.5 |
| Conventional | Magnesium chloride + sodium silicate No. 3 (3:1) | 16.0 | 13.6 |
| Non-treated | — | — | 9.8 |

The embodiments of the invention in which an exclusive property or privilege is claimed are defined as follows:

1. A stabilized sodium percarbonate composition consisting essentially of particles of sodium percarbonate uniformly coated with a film of a hydrophobic liquid organic compound in an amount of from about 5 to about 10 weight percent, based on the weight of said sodium percarbonate particles, said hydrophobic liquid organic compound having a melting point below about 15°C, a boiling point above about 100°C, and being non-reactive to and being a non-solvent for sodium percarbonate and sodium perborate, said hydrophobic liquid organic compound forming a moisture-resistant coating film on said sodium percarbonate particles, said composition also containing from about 5 to about 20 weight percent of a fine powder of sodium perborate, based on the weight of said sodium percarbonate particles, said sodium perborate particles being of smaller size than said sodium percarbonate particles and being mixed in or adhered to said film.

2. A composition as claimed in claim 1 in which said hydrophobic liquid compound is chlorinated paraffin or trichlorobenzene.

3. A composition as claimed in claim 1 in which said hydrophobic liquid compound is a saturated fatty alcohol having 5 to 10 carbon atoms or an unsaturated fatty alcohol having 5 to 18 carbon atoms.

4. A composition as claimed in claim 1 in which said hydrophobic liquid compound is selected from the group consisting of isoamyl alcohol, n-octylalcohol, oleyl alcohol and hexanol.

5. A composition as claimed in claim 1 in which said hydrophobic liquid compound is selected from the group consisting of dioctyl phthalate, dibenzyl sebacate and methyl oleate.

6. A composition as claimed in claim 1 in which said hydrophobic liquid compound is selected from the group consisting of castor oil, linseed oil, rape oil, peanut oil, soybean oil and rice bran oil.

7. A composition as claimed in claim 1 in which said hydrophobic liquid compound is selected from the group consisting of oleic acid, linoleic acid, undecanoic acid and caprylic acid.

8. A composition as claimed in claim 1 in which said hydrophobic liquid compound is selected from the group consisting of polyoxypropylene(4–8)sorbitol, polyoxypropylene(1–4)ethylenediamine, polyoxypropylene(1–10)$C_8$–$C_{22}$ alkyl ethers and polyoxypropylene (1–10)$C_8$–$C_{22}$ fatty acid esters.

9. A composition as claimed in claim 1 in which said hydrophobic liquid compound is selected from the group consisting of polyoxyethylene(1–3)$C_8$–$C_{22}$ alkyl ethers and polyoxyethylene(1–3)$C_6$–$C_{22}$ alkyl phenyl ethers.

10. A composition as claimed in claim 1, in which the particles of sodium perborate have a size of less than about 100 Tyler standard sieve size and the particles of sodium percarbonate have a size of more than 100 Tyler standard sieve size.

11. A composition as claimed in claim 10 in which the particles of sodium percarbonate are from 12 to 40 mesh size.

* * * * *